No. 656,480. Patented Aug. 21, 1900.
G. SCHMIDT.
VEHICLE LAMP.
(Application filed Dec. 15, 1897.)
(No Model.) 2 Sheets—Sheet 1.
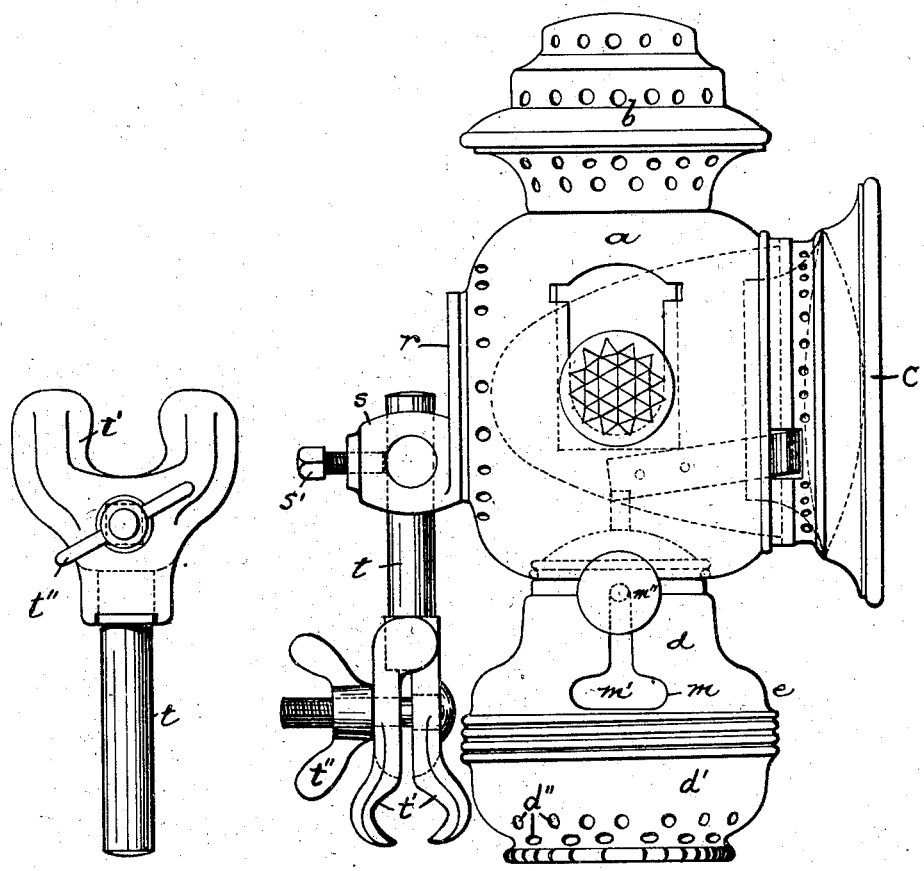
Fig. 2. Fig. 1.
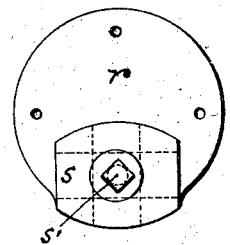
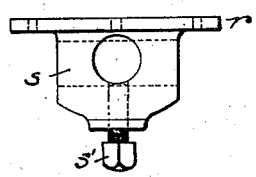
Fig. 3. Fig. 4.
WITNESSES: INVENTOR:
R. M. Everett Gustave Schmidt,
A. R. Krousse. BY Drake & Co.
ATTORNEYS.

No. 656,480.
Patented Aug. 21, 1900.
G. SCHMIDT.
VEHICLE LAMP.
(Application filed Dec. 15, 1897.)
(No Model.)
2 Sheets—Sheet 2.
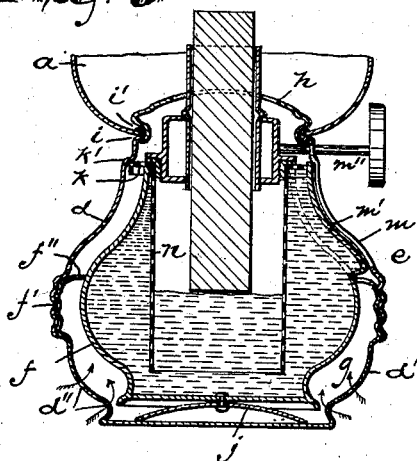
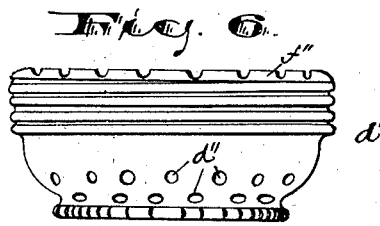
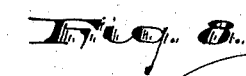
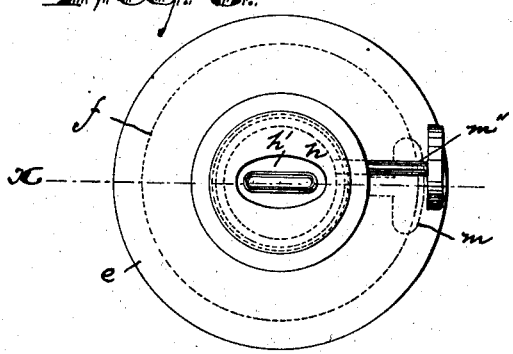
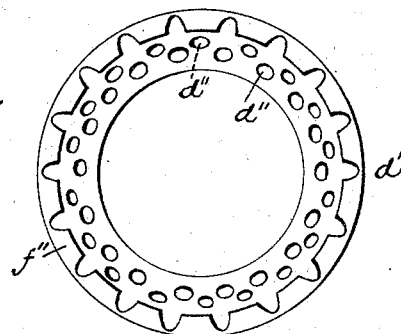
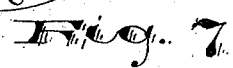
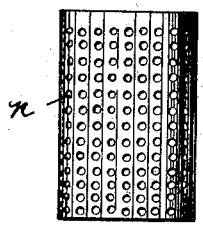
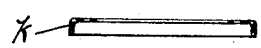
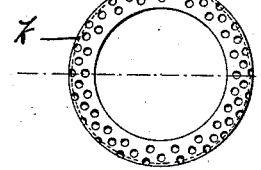
WITNESSES:
R. M. Everett
A. R. Krousse
INVENTOR
Gustave Schmidt
BY Drake & Co.
ATTORNEYS.

UNITED STATES PATENT OFFICE.

GUSTAVE SCHMIDT, OF NEWARK, NEW JERSEY.

VEHICLE-LAMP.

SPECIFICATION forming part of Letters Patent No. 656,480, dated August 21, 1900.

Application filed December 15, 1897. Serial No. 661,968. (No model.)

*To all whom it may concern:*

Be it known that I, GUSTAVE SCHMIDT, a citizen of the United States, residing at Newark, in the county of Essex and State of New Jersey, have invented certain new and useful Improvements in Vehicle-Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to more surely or perfectly avoid the premature extinguishing of the flame of a bicycle or carriage lamp while it is subjected to the air-currents and jarring effects due to the movement of the vehicle, and thus to avoid the frequent necessity to stop the vehicle to relight the lamp; to reduce the cost of construction and to secure a more neat and ornamental lamp; to enable the lamp to be applied to various fixtures or appliances of the vehicle without changing the attaching means, and to secure other advantages and results, some of which may be referred to hereinafter in connection with the description of the working parts.

The invention consists in the improved vehicle-lamp and in the arrangements and combinations of parts thereof, all substantially as will be hereinafter set forth and finally embraced in the clauses of the claim.

Referring to the accompanying drawings, in which like letters of reference indicate corresponding parts in each of the several views, Figure 1 is a side elevation of my improved lamp. Fig. 2 is a rear view of a portion of the attaching means. Figs. 3 and 4 are respectively a rear view and a plan of a bracket adapted to receive the said portion of the lamp-clamping means shown in Fig. 2. Fig. 5 is a central vertical section of the lower portion of the lamp, taken on line $x$, Fig. 8. Fig. 6 is a detail elevation of the lower member of the lamp-body incasement. Fig. 7 is a plan of the same. Fig. 8 is a plan showing the upper member of the said incasement with a lamp therein. Fig. 9 is a side view of a perforated cylinder adapted to extend down into the oil-chamber of the lamp-body to enable cotton or similar absorbent to be placed in the oil-chamber away from said wick. Fig. 10 is a plan showing a perforated diaphragm attached to the upper end of the oil-cup around the mouth thereof; and Fig. 11 is a section of the same, taken on line $y$, Fig. 10.

In said drawings, $a$ indicates the body of the lamp, having the usual smoke-dome $b$ and a front doorway $c$, of ordinary construction, with a lens and hinges to permit access to the interior of the said lamp-body. At the lower part of the body is a flaring section $d$, forming the upper member of an oil-cup incasement $e$, which incasement embraces one of the most important features of my present invention. To receive said upper member $d$ of the oil-cup incasement, the lamp-body is provided with a large perforation at its bottom, into which the upper end of the member $d$ is inserted. This upper end of the member $d$ has a groove, as at $i$, to receive the edges surrounding the said perforation in the body portion, and the margin $i'$ above said groove is then clenched down upon said edges of the body portion and a union of the parts thus secured without the use of solder. The said incasement conforms more or less closely to the outline of the oil-cup $f$, but is somewhat larger in diameter than the oil-cup, so as to form an annular chamber $g$ between, through which the outer atmospheric air is permitted to rise in a comparatively-thin film from the bottom of the incasement and yet with sufficient quantity to insure perfect combustion. At a point about midway of its length, as at $f'$, the said incasement is jointed, and the members thereof are provided with screw-threads, by means of which one member is screwed upon the other. The lower member $d'$ of the incasement is perforated near the bottom, as shown at $d''$, referring especially to Fig. 6, to permit a free and yet diffused inflow of air. By this construction the direct indrafts of air to the inside of the lamp are directed against the sides of the oil-cup and are thus deflected from a direct course and the force thereof is weakened, and a current is diffused, so that it passes upward from all sides of the lamp, thus rendering the draft uniform and regular. I may further diffuse the upward flow of air by inwardly bending the upward edge of the lower member $d'$ of the incasement, as at $f'''$, and providing the same with a series of notches or openings formed at a point midway of the vertical length of the chamber. These still further serve to prevent abnormal and irregular upward drafts, tending to prevent a proper vertical position of the flame.

An upwardly-convex piece $h$, of ordinary construction, having a central opening $h'$, adapted to loosely receive the wick-tube of the burner, is placed in the bottom of the body-chamber and covers the said large perforation therein, being secured by its edges in any suitable manner to the edges surrounding the perforation. The central opening $h'$ is large enough to afford passage-way around the wick-tube for the upcoming current of air, which is thus directed to the base of the flame.

At the upper end of the oil-cup $f$, preferably between the edges of the sides and the interiorly-threaded seat for the burner, I fasten a horizontal annular perforated flange $k$. (Shown in Figs. 10 and 11.) This serves to hold the said oil-cup centrally in its relation to the incasement, giving firmness to said lamp, and at the same time serves to diffuse the air as it flows upward to the flame and conduces to secure an evenness of flow at all sides. The incasement is shouldered where it is intended to receive said flange $k$, as at $k'$, and the said flange bears against the said shoulder, so as to prevent upward movement. At the bottom of the oil-cup the same is provided with a spring $j$, which holds the said flange $k$ up against the said shoulder $k'$ with an elastic pressure.

To insert the lamp, I simply press it up so that the perforated flange $k$ bears against the shoulder $k'$ and then screw the lower member $d'$ of the incasement upward, so that the spring $j$ upon the bottom of the oil-cup $f$ is pressed against by the bottom of the said incasement, and thus the parts are held immovably together with sufficient firmness.

A burner of any desired construction is screwed into the top of the oil-cup in the ordinary manner, and the side of the oil-cup incasement has in the side of its upper member $d$ a T-shaped aperture $m$, through which the wick-spindle $m''$ of the burner may pass when the oil-cup is removed from the lamp. To close this aperture $m$ when the oil-cup is in position in the lamp, I provide at the proper point on the outer surface of the oil-cup a projection $m'$. This projection may be formed in stamping out the oil-cup and projects a distance equal to the width of the air-chamber $g$ and at its outer surface corresponds in shape to the curvature of the member $d$ of the said oil-cup incasement, so that it completely covers said aperture from the inside and closes it.

Inside of the oil-chamber I place a perforated cylinder $n$ of a diameter about equal to the diameter of the mouth of the chamber. Said cylinder is secured with its top coincident with the mouth of the oil-cup and extends downward to a point at a greater or less distance above the bottom of the cup. The space around the outside of said cylinder may be filled with cotton or other absorbent material and the wick have an unobstructed space within said cylinder.

In practice I find it quite impossible under ordinary circumstances to extinguish the lamp by any inflow of air within the range of ordinary draft as found in nature. Furthermore, the ordinary jarring actions common in wheeling operations will not extinguish the lamp, so that it is especially adapted for use on bicycles; but while the small lamps made in accordance with my improvements are intended for bicycle or similar vehicles it is evident that the same lamp made on a larger scale may be employed as coach-lamps or the like.

At the back of the lamp the attaching means preferred is shown in Figs. 1, 2, 3, and 4. This attaching means is so arranged and constructed that the lamp may be attached with ease at either side of the vehicle and upon either vertical or horizontal fixtures. To this end I fasten to the back of the lamp a bracket consisting of a disk $r$, which is secured flatwise to the back of the lamp. Said disk at its one side fits the rear surface of the lamp-body and is adapted to be held thereto by rivets. At its opposite side or face the said disk is provided with a rearwardly-extending arm $s$, which is perforated both horizontally and vertically in a plane substantially parallel to the back of the lamp, as indicated in Fig. 3. Said arm may be centrally disposed on the disk; but I prefer to form it near the edge, as shown, in order to afford more space for the rivets. At its rearward extremity said arm is also bored and tapped and provided with a set-screw $s'$. In the perforations of the said arm is arranged a clamp consisting of an arm or shaft $t$, adapted to fit such perforation and be clamped therein to the arm $s$ and at its upper end provided with clamping members $t'$ $t'$, of any suitable construction, provided with a clamp-screw $t''$, of any ordinary construction. The said shaft, it will be observed, may be arranged either horizontally or vertically with respect to the arm or be turned pivotally within said arm, so as to bring the clamping-arm in any desirable position.

Having thus described the invention, what I claim as new is—

1. In a vehicle-lamp, the combination with the body and oil-cup of an incasement comprising upper and lower members $d$, $d'$, the upper member having a T-shaped aperture in its side to permit of the passage of the wick-spindle and its finger-piece and the lower member having its upper edges bent inward and notched or perforated and threaded to screw onto said upper member, substantially as set forth.

2. In a vehicle-lamp, the combination of the oil-cup incasement surrounding the oil-cup and holding it in position and having in its side an aperture to permit of the passage of the wick-spindle, and said oil-cup having a projection adapted to cover and tightly close said aperture from the inside when said oil-cup is in place within the incasement, substantially as set forth.

3. The combination with an oil-cup incasement having in its side an aperture for the passage of the wick-spindle, of an oil-cup having on one side a projection adapted to fit against the inner surface of said incasement around said aperture and close the same, substantially as set forth.

In testimony that I claim the foregoing I have hereunto set my hand this 7th day of December, 1897.

GUSTAVE SCHMIDT.

Witnesses:
CHARLES H. PELL,
C. B. PITNEY.